H. A. HOVENDEN.
LAWN RAKE.
APPLICATION FILED APR. 23, 1913.

1,133,964.

Patented Mar. 30, 1915.
2 SHEETS—SHEET 1.

Witnesses
J. C. Hennessy
V. B. Hillyard

Inventor
Hirram A. Hovenden

By Victor J. Evans
Attorney

H. A. HOVENDEN.
LAWN RAKE.
APPLICATION FILED APR. 23, 1913.
1,133,964.
Patented Mar. 30, 1915.
2 SHEETS—SHEET 2.
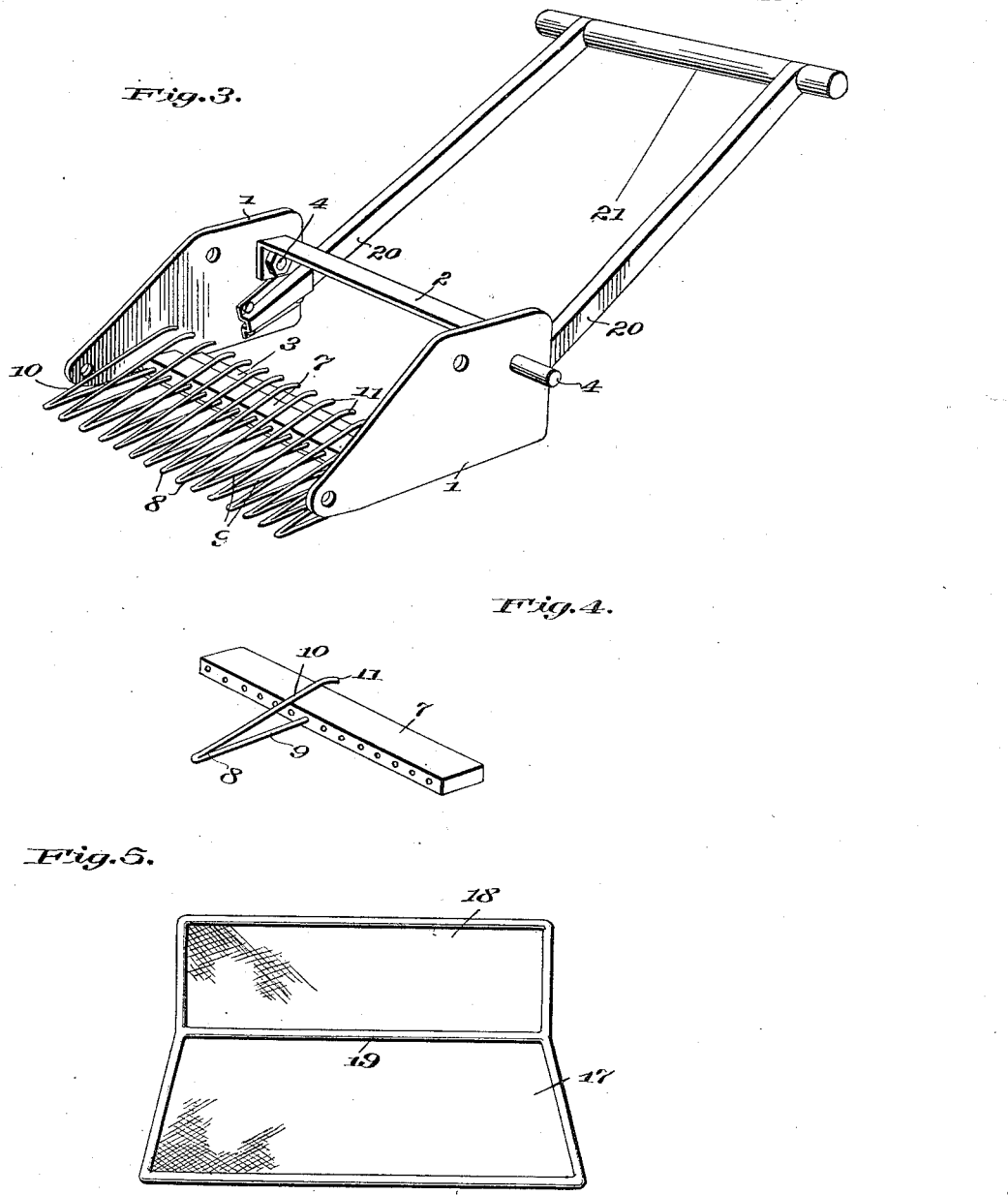
Witnesses
G. B. Hennery
V. B. Hillyard
Inventor
Hirram A. Hovenden,
By Victor J. Evans
Attorney

UNITED STATES PATENT OFFICE.

HIRRAM ALFRED HOVENDEN, OF SANDPOINT, IDAHO, ASSIGNOR OF ONE-HALF TO ALEXANDER ENOS, OF SANDPOINT, IDAHO.

LAWN-RAKE.

1,133,964.　　　　Specification of Letters Patent.　　Patented Mar. 30, 1915.

Application filed April 23, 1913.　Serial No. 763,112.

*To all whom it may concern:*

Be it known that I, HIRRAM ALFRED HOVENDEN, a citizen of the United States, residing at Sandpoint, in the county of Bonner and State of Idaho, have invented new and useful Improvements in Lawn-Rakes, of which the following is a specification.

The invention provides an implement designed chiefly for removing leaves, grass and trash from the lawn, said implement embodying a main frame mounted upon wheels which are used as drivers for operating an endless belt, which in conjunction with spring gathering teeth of peculiar form delivers the material gathered into the catcher.

The invention provides a frame of novel structure, a removable catcher fitted to the frame, a gatherer embodying spring teeth of peculiar form and an endless drag for moving the material gathered over the teeth and effecting a discharge thereof into the catcher.

The invention consists of the novel features, details of construction and combination of parts, which hereinafter will be more particularly set forth, illustrated in the accompanying drawings, and pointed out in the appended claims.

Figure 1:
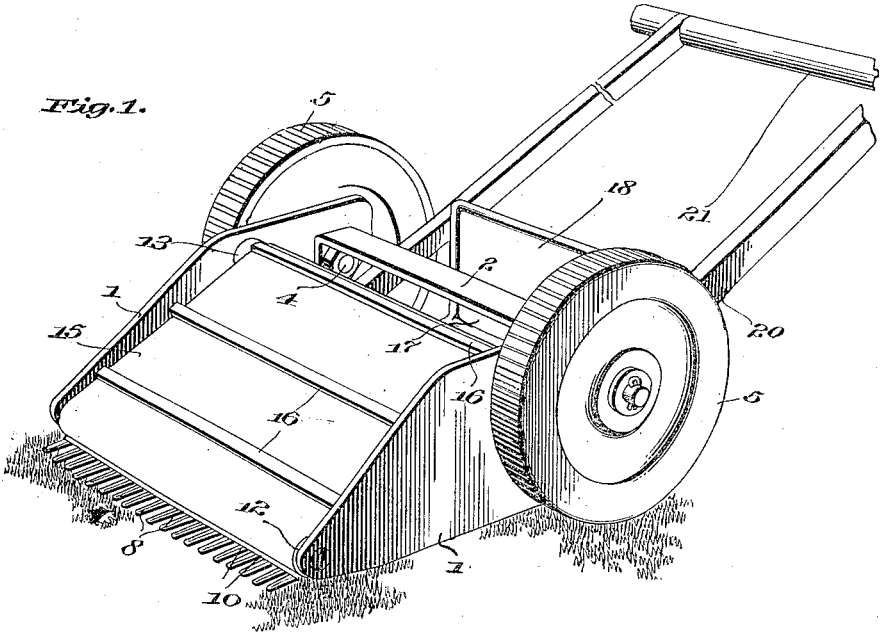
Figure 2:
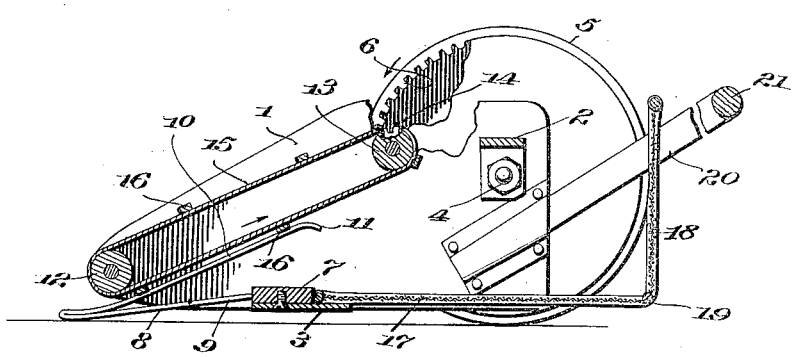

Referring to the drawings, forming a part of the specification, Figure 1 is a perspective view of a lawn rake embodying the invention. Fig. 2 is a longitudinal section thereof. Fig. 3 is a detail view of the main frame having the catcher and endless drag removed. Fig. 4 is a detail view of one of the spring teeth and the supporting bar therefor. Fig. 5 is a detail view of the catcher.

Corresponding and like parts are referred to in the following description, and indicated in all the views of the drawings, by the same reference characters.

The main frame comprises side pieces 1, an upper rear cross bar 2 and a lower forward cross bar 3. Stub axles project outwardly from the side pieces 1 and are utilized as connecting means for securing the ends of the cross bar 2 to the side pieces 1. Wheels 5 are mounted upon the stub axles 4 and each is provided with an internally toothed gear 6. A bar 7 is located at the front edge of the cross bar 3 and is attached thereto. A plurality of spring teeth 8 are secured to the bar 7, each of such teeth being approximately of V form and consisting of a lower member 9 and an upper member 10. The lower member 9 is let into the bar 7, whereas the upper member 10 curves upwardly and rearwardly, thence downwardly at its rear end, as indicated at 11. The upper members 10 of the spring teeth are longer than the lower members and overhang and clear the bar 7 so as to discharge the material gathered upon the catcher. The teeth 8 are formed of lengths of stout wire doubled upon themselves, the folds being short so as to form in effect gathering points which pass under leaves, grass and trash and leave the same without injuring the lawn. The spring action of the teeth enables the rake to conform to the surface of the lawn so as to remove all litter and loose material in the path of the rake when the latter is propelled thereover.

A roller 12 is journaled between the front ends of the side pieces 1 above the front ends of the teeth 8. A second roller 13 is mounted in the side pieces 1 some distance in the rear of the cross bar 3 and in a higher plane so as to elevate the rear portion of the endless drag. The ends of the roller 13 project beyond the side pieces 1 and have pinions 14 secured thereto, which are in mesh with the internally toothed gears 6, thereby admitting of the roller 13 being positively driven by the rotation of the wheels 5 when the rake is propelled over the lawn. The endless drag consists of a belt or apron 15 which passes around and is supported by the rollers 12 and 13, said endless belt being provided at intervals in its length with lags 16, which make positive engagement with the loose material to be gathered so as to move the same over the teeth 8 and effect a discharge thereof upon the catcher. The lower portion of the endless drag is arranged to press lightly upon the upper members 10 of the spring teeth so as to positively move the material thereover.

The catcher is located in the rear of the gathering devices and comprises a lower portion 17 and an upright portion 18. The lower portion 17 is arranged to occupy an approximately horizontal position between the side pieces 1 and is supported at its front end upon the rear portion of the cross bar 3 in the rear of the bar against which it abuts. The upright portion 18 prevents the loose material from escaping from the catcher after being delivered therein. The catcher in its preferable construction embodies a light frame of metal and a textile stretched thereover. The frame is of rectangular form and has its side members bent substantially at a right angle to correspond with the portions 17 and 18 of the catcher. A rod 19 is located at the angle formed by bending the side members of the frame, said rod serving to brace the side members of the frame at an intermediate point and also to support the textile closing the frame and secured thereto and serving as supporting means for the material. Handle bars 20 are secured to the side pieces 1 and extend upwardly and rearwardly therefrom and are connected by means of a cross bar 21. The upright portion 18 of the catcher passes between the handle bars 20 and may be secured thereto frictionally or in any desired way. The longitudinal edges of the catcher engage the inner faces of the side pieces 1 and are retained in place by frictional engagement or otherwise.

The device is used for collecting leaves, grass and litter generally by being pushed over the lawn with the front ends of the spring teeth 8 held loosely in contact with the surface so as to pass under the material to be gathered, such material when engaged by the teeth and passing thereon being positively moved therefrom and deposited in the catcher by means of the endless drag which is driven so that its lower portion travels upwardly and rearwardly. When the catcher has received a quantity of material it may be removed from the main frame, thereby admitting of such material being easily dumped in the required place of discharge, after which the catcher may be easily and quickly replaced so that if necessary the device may be further continued in service. The implement is light, strong and durable and is capable of being easily manipulated by hand.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A lawn rake embodying side pieces, an upper rear bar and a lower forward cross bar connecting the side pieces, wheels supporting the rear portions of the main frame, a drag, a toothed bar supported by and secured to the front portion of the lower forward cross bar and provided in its front edge with spring teeth, said teeth being of substantially V-form and constituting a short lower member and a long upper member, said upper members being of a length to permit the same to overhang the toothed bar and the lower bar and the free end of each upper arm being formed with a downwardly curved portion, the upper member serving as a support for material carried by the drag, the curved portions facilitating the discharge of said material.

2. A lawn rake embodying side faces, an upper rear bar and a lower forward cross bar connecting the side pieces, and wheels supporting the rear portion of the main frame, a toothed bar supported by and secured to the front portion of the lower forward cross bar and provided in its front edge with spring teeth of substantially V-form, the upper members of such teeth overhanging the toothed bar and the lower bar, an endless drag arranged to move the material over the upper members of the spring teeth, handle bars extending upwardly and rearwardly from the side pieces of the main frame, and a catcher removably and frictionally held between the side pieces and handle bars and having its front portion resting upon the rear part of the before mentioned lower bar and abutting against the rear edge of said toothed bar.

In testimony whereof I affix my signature in presence of two witnesses.

HIRRAM ALFRED HOVENDEN.

Witnesses:
RICHARD W. FAULKINGHOR,
WILLIAM C. McKEE.